United States Patent [19]

Saitoh et al.

[11] Patent Number: 5,780,132
[45] Date of Patent: Jul. 14, 1998

[54] COMPOSITE RUBBER ARTICLE AND METHOD OF MAKING

[75] Inventors: Shinji Saitoh; Masato Yoshikawa, both of Kodaira; Setsuo Akiyama, Sagamihara; Shingo Kato, Tokyo, all of Japan

[73] Assignee: Bridgestone Corporation, Tokyo, Japan

[21] Appl. No.: 736,783

[22] Filed: Oct. 25, 1996

Related U.S. Application Data

[63] Continuation of Ser. No. 360,000, Dec. 20, 1994, abandoned.

[30] Foreign Application Priority Data

Dec. 20, 1993 [JP] Japan ................................. 5-344833

[51] Int. Cl.⁶ ........................................................ B29D 22/00
[52] U.S. Cl. ................... 428/36.8; 428/36.9; 428/36.91; 428/447; 428/475.8; 428/476.3; 138/DIG. 7
[58] Field of Search ........................... 428/36.8, 36.91, 428/448, 36.9, 451, 474.7, 475.5, 475.8, 476.1, 476.3, 476.9, 447, 339; 138/DIG. 7

[56] References Cited

U.S. PATENT DOCUMENTS

| | | | |
|---|---|---|---|
| 5,013,781 | 5/1991 | Koshi et al. | 524/864 |
| 5,063,268 | 11/1991 | Young | 524/286 |
| 5,077,135 | 12/1991 | Wymam | 428/447 |
| 5,112,682 | 5/1992 | Inouye et al. | 428/448 |
| 5,246,778 | 9/1993 | Costemalle et al. | 428/398 |
| 5,264,262 | 11/1993 | Igarashi et al. | 428/36.91 |
| 5,576,101 | 11/1996 | Saitoh et al. | 428/332 |

FOREIGN PATENT DOCUMENTS

| | | | |
|---|---|---|---|
| 2147188 | 12/1985 | Japan | 428/36.9 |
| 5-150408 | 6/1990 | Japan . | |
| 6246875 | 9/1994 | Japan | 428/36.91 |

*Primary Examiner*—Rena L. Dye
*Attorney, Agent, or Firm*—Sughrue, Mion, Zinn, Macpeak & Seas, PLLC

[57] ABSTRACT

A composite rubber article is obtained by joining a rubber composition based on a brominated p-methylstyrene/isobutylene copolymer to a different material such as a plastic, inorganic and metallic material through a di-, tri- or tetra-alkoxysilane compound. The copolymer is firmly joined to the different material. The invention is applicable to the manufacture of composite rubber articles such as tires, high-pressure hoses, and pneumatic springs.

8 Claims, No Drawings

COMPOSITE RUBBER ARTICLE AND METHOD OF MAKING

This is a Continuation of Application No. 08/360,000 filed Dec. 20, 1994, now abandoned.

BACKGROUND OF THE INVENTION

1. Field of the Invention

This invention relates to a composite rubber article, typically a rubber tube wherein a rubber composition is joined to a different material and a method for preparing the same.

2. Prior Art

Refrigerant transfer hoses are often used as conduits in automotive air conditioners. For the purpose of preventing leakage of refrigerant, typically FREON therefor there are proposed composite hoses in which a resinous gas-barrier layer is lined inside a rubber layer of an inner tube. For FREON (.e.i., 1, 1, 1, 2-tetrafluoroethane) a used as the refrigerant, sulfur- and resin-vulcanized butyl rubbers (or isobutylene-isoprene rubbers IIR) are used as the inner tube rubber layer. These rubbers are chosen because they are resistant to water permeation as compared with acrylonitrile-butadiene rubber (NBR) and acrylic rubber and thus do not allow permeation of water through the hose wall, avoiding any adverse effect to the system.

However, several problems were found with the sulfur-vulcanized butyl rubber. Since it can be softened by heating, it is less durable in that burst and blow-off can take place when used as the inner tube rubber layer for a long period of time. Since the sulfur-vulcanized butyl rubber is also less resistant to compression set, leakage of the refrigerant can occur when the rubber is subject to thermal softening as well as thermal aging.

Resin-vulcanized butyl rubber is more resistant to compression set and thermal softening than the sulfur-vulcanized butyl rubber. However, the resin-vulcanized butyl rubber requires a higher temperature and hence, A more energy consumption for vulcanization. Some restrictions are imposed on the high-temperature temperature vulcanization process. Therefore the resin-vulcanized butyl rubber is less efficient to manufacture. If resin-vulcanizable butyl rubber and sulfur-vulcanizable butyl rubber are vulcanized under the same conditions, then the resin-vulcanized butyl rubber is less resistant to compression set than the sulfur-vulcanized butyl rubber.

Copolymers of isobutylene and para-methylstyrene wherein the para-methylstyrene is partially brominated are known to be well resistant to thermal softening, heat and compression set, but are difficult to join to different materials. It is then difficult to manufacture composite hoses by integrating the copolymers with different materials. There is a need to have a technique capable of joining the copolymers to different materials.

SUMMARY OF THE INVENTION

Therefore, an object of the present invention is to provide a composite rubber article, typically a rubber tube wherein a copolymer of isobutylene and para-methylstyrene wherein the para-methylstyrene is partially brominated is firmly joined to a different material. Another object of the present invention is to provide a method for preparing the composite rubber article.

It is desired that a rubber composition based on a copolymer of isobutylene and para-methylstyrene wherein the para-methylstyrene is partially brominated, which is simply referred to as a brominated IB-PMS copolymer, hereinafter, is integrated to a different material such as plastic, inorganic and metallic materials. We have found that when the rubber composition and the different material are joined through an alkoxysilane compound of the following general formula:

wherein each of $R^1$ and $R^2$ is a saturated or unsaturated monovalent hydrocarbon group or alkoxy group and each of $R^3$ and $R^4$ is a saturated or unsaturated monovalent hydrocarbon group, the brominated IB-PMS copolymer can be readily and firmly bonded to the different material.

We have found that by joining a resinous material, typically a polyamide resin to the brominated IB-PMS copolymer through the specific alkoxysilane compound, there is obtained a rubber tube or hose in which the IB-PMS copolymer and the resinous material are firmly bonded and which has sufficient gas barrier properties to restrain permeation of Freon gas.

It is more effective to modify a surface of the different material by low-temperature plasma treatment or corona discharge treatment. By applying a solution of the alkoxysilane compound of formula (1) to the modified surface of the different material and then attaching the brominated IB-PMS copolymer to the different material, the bond between the different material and the brominated IB-PMS copolymer is enhanced.

Accordingly, the present invention provides a composite rubber article wherein a rubber composition based on a copolymer of isobutylene and para-methylstyrene wherein the para-methylstyrene is partially brominated (brominated IB-PMS copolymer) is joined to a different material through an alkoxysilane compound of formula (1).

The present invention also provides a rubber tube wherein a rubber composition based on a brominated IB-PMS copolymer is joined to a resinous material through an alkoxysilane compound of formula (1).

According to the method of the present invention, a composite rubber article wherein a rubber composition is joined to a different material is prepared by the steps of: modifying a surface of the different material by low-temperature plasma treatment or corona discharge treatment, applying a solution of an alkoxy-silane compound of formula (1) to the treated surface, and applying and vulcanizing a rubber composition based on a brominated IB-PMS copolymer to the coated surface of the different material.

DETAILED DESCRIPTION OF THE INVENTION

The rubber composition used herein contains as a main component a copolymer of isobutylene and para-methylstyrene wherein the para-methylstyrene is partially brominated (brominated IB-PMS copolymer).

The brominated IB-PMS copolymer is an IB-PMS copolymer in which part of PMS is brominated for crosslinking as disclosed in Japanese Patent Application Kokai (JP-A) No. 150408/1990. The percent bromination is preferably 10 to 80%, especially 20 to 70% of copolymerized PMS. No effective crosslinking would be expected with a percent bromination of less than 10% whereas heat resistance would be low with a percent bromination of more than 80%.

3

Isobutylene and para-methylstyrene are copolymerized in such a proportion that the copolymer contains 2 to 20% by weight.. especially 5 to 10% by weight of PMS. Copolymers containing more than 20% by weight of PMS would have a higher glass transition temperature (Tg) and lose rubber properties whereas copolymers containing less than 2% by weight of PMS would be low in crosslinking efficiency.

The rubber composition may consist of the brominated IB-PMS copolymer. If desired, additives may be blended in the rubber composition. Suitable additives include reinforcing fillers such as carbon black and silicic acid, fillers such as calcium carbonate and mica, vulcanization accelerators, and activators.

The different materials which are joined, to the rubber composition include plastic materials, inorganic materials and metallic materials, for example, polyethylene, polyester, polyamide resin., glass, aluminum, and stainless steel. In preparing rubber tubes or hoses, resinous materials such as polyamide resins are often used.

According to the present invention, the rubber composition is joined to the different material through an alkoxysilane compound of the following general formula (1):

In formula (1), each of $R^1$ and $R^2$ is a saturated or unsaturated monovalent hydrocarbon group or alkoxy group such as methoxy and ethoxy groups. The saturated or unsaturated hydro-carbon groups preferably have 1 to 20 carbon atoms. Examples of the saturated hydrocarbon group include alkyl groups such as methyl, ethyl and propyl groups, aminoalkyl groups, mercapto-alkyl groups, and halogenated alkyl groups. Examples of the unsaturated hydrocarbon group include vinyl, vinylalkyl and methacryloxyalkyl groups.

Each of $R^3$ and $R^4$ is a saturated or unsaturated monovalent hydrocarbon group, preferably having 1 to 3 carbon atoms. Exemplary hydrocarbon groups are the same as described for $R^1$ and $R^2$ while alkyl groups such as methyl and ethyl groups are preferred. That is, preferred examples of -$OR^3$ and -$OR^4$ are alkoxy groups such as methoxy and ethoxy groups.

The organosilane of formula (1) may be any of tetraalkoxysilanes wherein both $R^3$ and $R^4$ form alkoxy groups and both $R^1$ and $R^2$ are alkoxy groups; trialkoxysilanes wherein both $R^3$ and $R^4$ form alkoxy groups and either $R^1$ or $R^2$ is an alkoxy group; and dialkoxysilanes wherein both $R^3$ and $R^4$ form alkoxy groups and neither $R^1$ nor $R^2$ is an alkoxy group.

The alkoxysilane compound used herein is thus preferably a dialkoxysilane or a trialkoxysilane or a mixture thereof. Several non- limiting examples of the alkoxysilane compound include methyltriethoxysilane, vinyltrimethoxysilane, phenyltrimethoxysilane, 3-aminopropyltrimethoxysilane, 3-chloropropyltrimethoxysilane, 3-mercaptopropyltrimethoxysilane, 3-glycidoxypropyl-trimethoxysilane, 3-methacryloxypropyl-trimethoxysilane, and 3-ureidopropyl-trimethoxysilane.

In the practice of the invention, the alkoxysilane compound is used by applying it to a different material. Application may be made by any desired technique such as dipping, bar coating, and spin coating. The resulting coating is preferably about 0.01 to 10 µm thick. On coating, the alkoxysilane compound may be a concentrated liquid or diluted with methanol or similar solvents.

In the practice of the invention, it is recommended from the standpoint of enhanced adhesion to carry out pretreatment such as plasma discharge or corona discharge treatment on a surface of a different material prior to coating of the different material with the alkoxysilane compound. Such a pretreatment can be carried out in a conventional manner.

A corona discharge is preferably generated at a frequency of 5 to 50 kHz, especially 20 to 30 kHz. Below 5 kHz, stable uniform pretreatment is difficult and the power consumption increases so that the power cost is increased and the electrodes are reduced in endurance. A voltage of 3 to 100 kV is preferred. Less than 3 kV is too low to generate and maintain an electric discharge. However, the voltage is not limited to this range if a stable electric discharge is established by a proper choice of electrode configuration, air gap, resin thickness, and counter electrode configuration. The atmosphere for a corona discharge is often air because of convenience of installation. For more effective treatment, corona discharge treatment may be done in a suitable gas atmosphere such as inert gas, oxygen and nitrogen or by blowing such a gas in proximity to the electrode.

Another effective pretreatment is a plasma discharge which may be generated at a frequency of 1 kHz to 30 MHz. A frequency of less than 1 kHz would fail to produce a stable uniform discharge. A voltage of 0.5 to 30 kV is preferred. The atmosphere under which a plasma discharge is produced may be various inert gases or reactive gases and have a pressure of 1 to $10^5$ Pa.

As compared with corona discharge, the plasma discharge is intensive for the treatment purpose and more in uniformity and denseness of treatment, but requires a large size of installation because the atmospheric gas and pressure must be carefully controlled. Either a corona or plasma discharge may be selected while taking into accounts these restrictions.

According to the present invention, a composite rubber article is prepared by coating the alkoxysilane compound to a different material, typically to a corona or plasma-treated surface thereof, applying an uncured rubber composition to the coated material, and effecting heat vulcanization or the like to crosslink the brominated IB-PMS copolymer. At the same time, bonding reaction occurs between the brominated IB-PMS copolymer and the alkoxysilane compound whereby a firm joint is established between the brominated IB-PMS copolymer and the different material.

EXAMPLE

Examples of the present invention are given below by way of illustration and not by way of limitation.

Example 1

Onto a surface of a float glass of 3 mm thick, a 10% methanol solution of γ-glycidoxy-propyltrimethoxysilane (KBM403 commercially available from Shin- Etsu Chemical Co., Ltd.) was thinly coated once with a brush. After drying at room temperature for 30 minutes, a rubber composition as formulated below was laid on the coated glass surface and vulcanized by means of a hot press at a pressure of 2 kgf/cm² and a temperature of 140° C. for 80 minutes.

| Rubber composition | Parts by weight |
|---|---|
| XP-50* | 100 |
| FET carbon | 50 |
| Stearic acid | 2 |
| Zinc white | 0.5 |
| Accelerator TT** | 0.1 |

*XP-50 is a copolymer rubber of isobutylene and paramethylstyrene in which the para-methylstyrene is partially brominated which is commercially available under the trade name Bromo XP-50 from Exxon Co.
**Accelerator TT is Nocceler TT commercially available from Ouchi Shinko Kagaku K.K.

\* XP-50 is a copolymer rubber of isobutylene and paramethylstyrene in which the para-methylstyrene is partially brominated which is commercially available under the trade name Bromo XP-50 from Exxon Co.

\*\* Accelerator TT is Nocceler TT ommercially available from Ouchi Shinko Kagaku K.K.

The vulcanized rubber sample was cut to a width of 12 mm and tested by a tensile tester Autograph (manufactured by Shimazu Mfg. K.K.) according to a T-peel method at a pulling speed of 50 mm/min. The bond strength between glass and rubber was measured to be 4.0 kgf/inch.

EXAMPLE 2

A surface of an aluminum plate of 1.0 mm thick was degreased and treated with an argon plasma. More specifically, an argon atmosphere was established in a glass chamber of 10 cm×25 cm×15 cm (spacing) interposed between parallel flat plate external electrodes. Using a high-frequency power supply (SKN-05P) and a matching box (MB-500) manufactured by Nippon High-Frequency K.K., the aluminum plate was treated for 5 minutes in the glass chamber at an argon pressure of 0.7 Torr, 13.56 MHz and an output of 100 W. To the aluminum plate surface, a 5% methanol solution of N-β-(N-vinyl-benzylaminoethyl)-γ-aminopropyltrimethoxy- silane hydrochloride (SZ-6032 commercially available from Toray Silicone K.K.) was thinly brush coated. After drying at room temperature or 30 minutes, the same rubber composition as in Example 1 was laid on the coated aluminum surface and vulcanized under the same conditions as in Example 1. By the same test as in Example 1, the bond strength was measured to be 6.5 kgf/inch.

Example 3 and Comparative Example 1

Using a T- die extruder, 6–66 copolymer nylon (5033 commercially available from Ube Kosan K.K.) was extruded into a film of 150 μm thick. The film was subject to a corona discharge treatment. Using electrodes of 100 mm long by 4 mm wide by 10 mm spacing and a power supply HV05 –2 (manufactured by TANTEC K.K.), a corona discharge was generated at a voltage of 8.0 kV (RMS) and an output of 65 W. The nylon film was passed through the discharge at a speed of 3 m/min. To the treated film surface, a 10% methanol solution of γ-methacryloxypropyl-methyldimethoxysilane (TSL8375 commercially available from Toshiba Silicone K.K.) was thinly brush coated. The same rubber composition as in Example 1 was laid on the coated film surface and vulcanized under the same conditions as in Example 1.

For comparison purpose, Desmodur RE (commercially available from Bayer AG) was brushed coated to the same nylon film as above and the rubber composition was vulcanized under the same conditions.

Each vulcanized sample was cut to a width of 12 mm and measured for bonding force on 180° peeling at a pulling speed of 50 mm/min. by means of a tensile tester Autograph. The peeled surface was visually observed. The results are shown in Table 1.

TABLE 1

|  | Adhesive | Bonding force | Peeled surface |
|---|---|---|---|
| Example 3 | TSL8375 | 7.0 kgf/inch | rubber cohesive failure |
| Comparative Example 1 | Desmodur RE | 3.7 kgf/inch | nylon-rubber interfacial failure |

Example 4 and Comparative Example 2

As in Example 3, 6–66 copolymer nylon (5033 commercially available from Ube Kosan K.K.) and 12 nylon (3035 commercially available from Ube Kosan K.K.) were extruded into films of 150 μm thick, which were subject to a corona Discharge treatment.

To the treated nylon films, three coating solutions were thinly brush coated: (1) a 10% methanol solution of γ-(2-aminoethyl)-aminopropyltrimethoxysilane (SH6020 commercially available from Toray- Dow Corning K.K.), (2) a 5% methanol solution of N-β-(N-vinylbenzyl-aminoethyl)-γ-aminopropyltrimethoxysilane hydrochloride (SZ6032 commercially available from Toray- Dow Corning K.K.), and (3) an ethyl acetate solution of triphenylmethane triisocyanate (Desmodur RE commercially available from Bayer AG) for comparison purpose. After drying with hot air at 60° C. for 5 minutes, sheets of the same rubber composition as in Example 1 were laid on the coated films and vulcanized by means of a hot press at a pressure of 2 kgf/cm$^2$ and a temperature of 140° C. for 80 minutes.

Using molds of different depths, two types of samples of nylon resin joined to rubber were prepared to a total thickness of 3.1 mm and 1.1 mm. The former samples were used for the measurement of bond strength. The latter samples were used for the measurement of gas permeability.

The thus obtained samples were measured for bond strength as in Example 1. Using a gas permeability meter (GTR- 30XB manufactured by Yanako Bunseki Kogyo K.K.), the amount of Freon R-22 gas permeated through the sample at 100° C. was measured. The gas permeability measurement 10 was the same as prescribed in JIS K- 1707 except that the test was done at 100° C. The results of bond strength and gas permeability are shown in Tables 2 and 3, respectively.

TABLE 2

| Resin | Adhesive layer | Bonding force (kgf/inch) | Peeling form | Remarks |
|---|---|---|---|---|
| 6-66 copolymer nylon | (1) | 6.8 | rubber cohesive failure | Invention |
|  | (2) | 6.9 | rubber cohesive failure | Invention |
|  | (3) | 3.7 | nylon-rubber interfacial failure | Comparison |

TABLE 2-continued

| Resin | Adhesive layer | Bonding force (kgf/inch) | Peeling form | Remarks |
| --- | --- | --- | --- | --- |
| 12 nylon | (1) | 6.9 | rubber cohesive failure | Invention |
| | (2) | 7.1 | rubber cohesive failure | Invention |
| | (3) | 3.0 | nylon-rubber interfacial failure | Comparison |

TABLE 3

| Resin | Adhesive layer | Gas permeability (ml/m² · 24 h · atm) | Remarks |
| --- | --- | --- | --- |
| 6-66 copolymer nylon | (1) | 1,300 | Invention |
| | (2) | 1,000 | Invention |
| | (3) | 2,200 | Comparison |
| 12 nylon | (1) | 20,000 | Invention |
| | (2) | 16,000 | Invention |
| | (3) | 48,000 | Comparison |

Example 5 and Comparative Example 3

A refrigerant carrying hose was prepared. A resin layer of 10 μm thick was prepared from a composition consisting of 60% by weight of nylon-6, 30% by weight of nylon-12, and 10% by weight of polyolefin and subject to a corona discharge treatment as in Example 3. Solution (2) in Example 4 was coated onto the treated surface of the resin layer and dried. The same rubber composition as in Example 1 was extruded onto the resin layer to form an inner tube rubber layer. The inner tube rubber layer had a thickness of 1.6 mm and an inner diameter of 10.4 mm.

The inner tube was covered with reinforcing braids of polyethylene and an intermediate layer of a rubber composition as formulated below. A rubber composition as formulated below was extruded thereover to form an outer rubber layer having a thickness of 1.2 mm and an outer diameter of 18.5 mm. The layer structure was vulcanized at 150° C. for 45 minutes, obtaining a hose A (Example 5).

| Component | Parts by weight |
| --- | --- |
| Intermediate layer rubber composition | |
| IIR | 85 |
| EPDM | 15 |
| FEF carbon | 70 |
| SRF carbon | 30 |
| Aromatic oil | 20 |
| Zinc white | 5 |
| Accelerator DM | 0.5 |
| Accelerator TT | 1.0 |
| Vulnok R | 1.0 |
| Sulfur | 1.0 |
| Outer layer rubber composition | |
| EPDM | 100 |
| FEF carbon | 130 |
| Naphthene oil | 50 |
| Aromatic oil | 50 |
| Zinc white | 5 |
| Stearic acid | 5 |
| Accelerator M | 1.2 |
| Accelerator TT | 1.5 |
| Accelerator TS | 1.8 |

-continued

| Component | Parts by weight |
| --- | --- |
| Vulnok R | 1.2 |
| Sulfur | 1.0 |

For comparison purposes, a hose B was prepared by the same procedure as above except that solution (3) in Example 4 was coated instead of solution (2) (Comparative Example 3).

These hoses A and B were cut to examine the adhesion between the resin layer and the rubber layer of the inner tube. Hose A had a firm bond, but hose B had a poor bond.

There has been described a composite rubber article wherein a brominated IB-PMS copolymer is firmly and integrally joined to a different material such as plastic, inorganic and metallic materials. The present invention is advantageously applicable to the manufacture of composite rubber articles such as tires, high-pressure hoses, and pneumatic springs. The present invention is effective especially in the manufacture of hoses and tubular articles in which the different material is located inside.

Japanese Patent Application No. 5-344833 is incorporated herein by reference.

We claim:

1. A rubber tube comprising, in order starting from the outside:

(a) a rubber composition layer comprising a rubber component comprising a copolymer of 98 to 80% by weight of isobutylene and 2 to 20% by weight of a brominated para-methylstyrene with the degree of bromination of the copolymer being 10 to 80%, (b) a layer comprising an alkoxysilane compound of the formula:

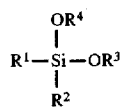

wherein each of $R^1$ and $R^2$ is a saturated or unsaturated monovalent hydrocarbon group or alkoxy group, and each of $R^3$ and $R^4$ is a saturated or unsaturated monovalent hydrocarbon group, and (c) a resinous material layer.

2. The rubber tube of claim 1 wherein said resinous material is a polyamide resin.

3. The rubber tube of claim 1 wherein said resinous material is disposed inside the rubber tube.

4. The rubber tube of claim 1, wherein a surface of said resinous material layer which is adjacent to the layer comprising the alkoxysilane compound has been modified with a low-temperature plasma treatment or a corona discharge treatment.

5. The rubber tube of claim 1, wherein, in component (a), the partially brominated copolymer of isobutylene and para-methylstyrene is 20 to 70% brominated.

6. The rubber tube of claim 1, wherein, in component (a), the para-methylstyrene is present in the copolymer in an amount of 5 to 10% by weight.

7. The rubber tube of claim 1, wherein the alkoxysilane compound is a compound selected from the group comprising methyltriethoxysilane,
vinyltrimethoxysilane,
phenyltrimethoxysilane,
3-aminopropyltrimethoxysilane,
3-chloropropyltrimethoxysilane,
3-mercaptopropyltimethoxysilane,
3-glycidoxypropyltrimethoxysilane,
3-methacryloxypropyltrimethoxysilane, and
3-ureidopropyltrimethoxysilane.

8. The rubber tube of claim 1, wherein the layer comprising the alkoxysilane compound has a thickness of 0.01 to 10 µm.

* * * * *